3,728,273
METHOD OF RECOVERING CHROMIUM AND BARIUM VALUES FROM WASTE BARIUM CHROMATE
Charles P. Bruen, Bernardsville, N.J., and Christian A. Wamser, Camillus, N.Y., assignors to Allied Chemical Corporation, New York, N.Y.
Filed Sept. 27, 1971, Ser. No. 183,969
Int. Cl. C09k 3/00; H05b 33/00
U.S. Cl. 252—182          23 Claims

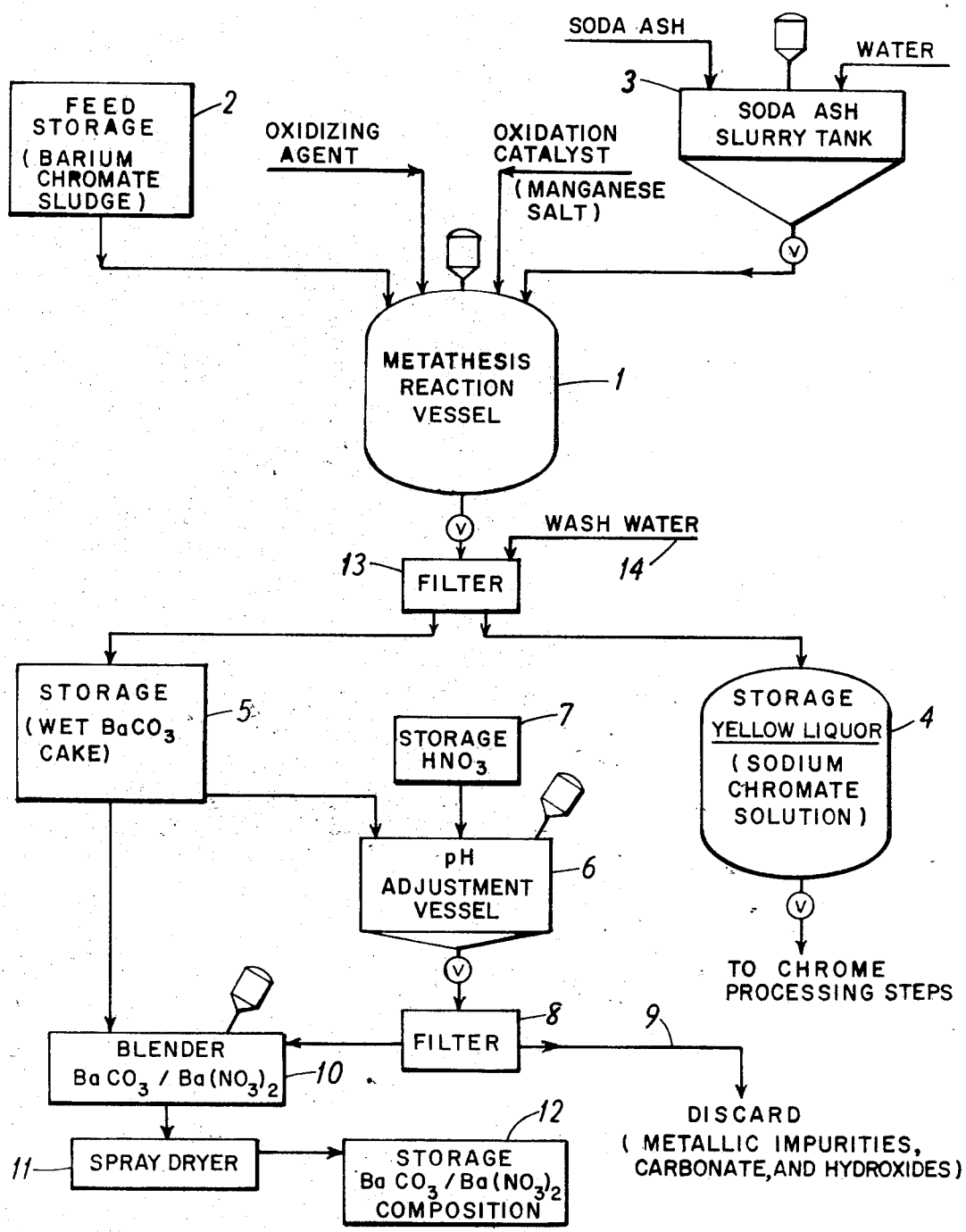
FLOW DIAGRAM:
RECOVERY OF CHROMIUM VALUES AND
RE-USABLE BARIUM CARBONATE COMP.
FROM BARIUM CHROMATE SLUDGE.
INVENTORS
CHRISTIAN A. WAMSER
CHARLES P. BRUEN
BY
AGENT United States Patent Office 3,728,273
Patented Apr. 17, 1973

ABSTRACT OF THE DISCLOSURE

Recovery of chromium values and a re-usable barium carbonate composition from barium chromate waste treatment sludges, by digestion in an aqueous medium with at least a 100% stoichiometric excess of sodium carbonate, at temperatures between 80 and 250° C. A solution of sodium chromate "yellow liquor" is separated from the solid barium carbonate, a portion of which is dissolved in nitric acid at a pH of 4.5 to 5.5 as a means of purging insoluble impurities. The separated barium nitrate is recombined with the balance of the barium carbonate to provide the re-usable barium carbonate composition.

BACKGROUND OF THE INVENTION

(I) Field of the invention

The treatment and disposal of chrome plating wastes has long been a problem confronting the plating industry, and the problem has become more acute with growth of the demand for chrome plate, particularly in view of the growing need for pollution control.

Most efforts in this direction have been toward treatment and disposal of the chrome plating wastes. It has usually been considered sufficient to convert the soluble chromium waste to a less objectionable insoluble sludge for disposal. Those methods which have been disclosed to recover chromium values have been costly and not wholly satisfactory, thus there is a real need for a practical and economic approach to the recovery of chromium values from industrial chromium wastes.

(II) Description of the prior art

The most common method for treatment and disposal of chrome plating wastes is based on chemical reduction of the chromate (usually by means of $SO_2$ or sodium bisulfite in acidic medium) followed by neutralization with lime to precipitate the trivalent chromium thus formed. Another method which has been practiced on an industrial scale is based on precipitation of the chromate as the barium salt by treatment of the waste with barium carbonate. The conditions under which chromate in the waste is essentially quantitatively precipitated are defined in U.S. Pat. 3,371,034. The waste sludge solids which are discarded contain barium chromate, barium carbonate and variable amounts of barium sulfate, along with some trivalent chromium and metal impurities present in the waste that was treated.

U.S. Pat. 3,552,917 discloses a process for recovering the chromate values from waste aqueous chromic acid by a decomposition step with excess sulfuric acid followed by removal of residual sulfate by successive treatments with calcium and strontium salts. Unfortunately, the yield of recovered chromate is low, and the consumption of sulfuric acid and other reactants high, hence the process is neither economical nor efficient.

A disclosure of laboratory work carried out in Germany well over a century ago indicated that barium carbonate and sodium chromate solution could be prepared by the decomposition of barium chromate using sodium carbonate. The article, identified below, also emphasized the marked difference in behavior between barium chromate and barium sulfate, which compounds are known to have certain common characteristics; "Ueber die Zersetzung Unloslicher Salze Vermittelst der Losungen Aufloslicher Salze," Heinrich Rose, Annalen der Physik und Chemie, 95, 426–41 (1855).

This early experimenter recognized that heat augmented the reaction, which he explored using both an aqueous solution and a melt on a 1:1 molar basis, but the reported yields were so poor (5.3 to 14.3% of theory, $Na_2CrO_4$), that the findings made no impression on the art. The degree to which this is true becomes apparent when one considers the importance of this disposal problem, and the time and money expended in attempting to solve it.

SUMMARY OF THE INVENTION

It has now been found, surprisingly, that if barium chromate is digested with a stoichiometric excess of sodium carbonate in an aqueous medium of between about 100 and 1000%, preferably between 300 and 900%, the chromium value of the barium chromate can be recovered as a solution of sodium chromate (yellow liquor) in yields of about 90% of theory. Although an excess of sodium carbonate greater than 1000% can be used, no additional advantage accrues therefrom. The barium carbonate formed by the reaction is reusable in the treatment of additional soluble chromium waste liquors. Preferably, this barium carbonate is prepared as a barium carbonate/barium nitrate composition which is particularly effective for the treatment of such waste chromium liquors. This composition is prepared by treating a portion of the barium carbonate obtained by the metathetical or double decomposition reaction of the barium chromate and sodium carbonate, with nitric acid. The pH is adjusted therewith to about 3.5 to 6.0, preferably to 4.5 to 5.5, at which point most of the barium present in the portion taken, is in the form of the nitrate, and the metallic impurities which are substantially insoluble at a pH of about 5.0 are separated from the barium nitrate and purged from the system. The relation between the weight of the portion taken for nitric acid treatment, and the remainder, depends on the amount of metallic impurities, and on the level of impurities in the barium carbonate which are considered acceptable. If the amount of impurities present are low, treatment of 2 or 3% of the total will be sufficient, whereas when the impurities are present in large quantities, a portion of more than 5% is in order.

When the impurities and the small amount of barium carbonate which generally remains undissolved, have been separated, the remaining barium nitrate is combined with the balance of the barium carbonate as the desired barium carbonate/barium nitrate composition. Where shipment of this reusable barium carbonate composition is planned, the composition may be dried by spray drying or other conventional means.

In those instances where the barium chromate sludge is so heavily contaminated with metallic impurities that the above procedure will not produce a sufficiently pure product, a separate nitric acid treatment can be used to advantage to prepare a barium nitrate solution substantially free of these metallic contaminants which may in turn be combined with barium carbonate to prepare the aforesaid barium carbonate/barium nitrate composition. In this modification, all of the barium carbonate is treated with the nitric acid, and brought to a pH of between 3.5 to 6.0. A pH of 4.5 to 5.5 is preefrred, and has been found very effectve, because if the solution is too acid, the impurities will be kept in solution and carried along. If the pH is 6.0, substantially none of the metallic impurities will remain with the barium nitrate, but only about 7% of the barium will be converted to the nitrate. At a pH of 5.0, about 95% of the barium will be converted to barium nitrate, and 92–96% of the metallic impurities will remain insoluble as metal carbonates and hydroxides.

After the metallic impurities and the small amount of undissolved barium carbonate have been separated, the barium nitrate is combined with barium carbonate from other runs, preferably to the extent of about 4 to 6% by weight, to produce the desired barium carbonate/barium nitrate composition.

If all the chromium in the barium chromate sludge is in the hexavalent form, no appreciable amount would be lost in the purge of metallic impurities, but if part of the chromium is present in the trivalent form, the trivalent chromium would remain as insoluble $Cr(OH)_3$ after the nitric acid treatment, and would be purged from the system along with the metallic impurities. Therefore, if trivalent chromium is present in the barium chromate sludge and has not been pre-oxidized, it is expedient to oxidize all the trivalent chromium to the hexavalent state, preferably during the digestion step. Air, oxygen, or ozone can be used with a catalyst, preferably a manganese salt, if the temperature of the digestion is substantially the boiling point of the mixture. At higher temperatures which generally require the use of an agitated autoclave, no catalyst is necessary. Many other oxidizing agents are also suitable, such as chlorine gas, hydrogen peroxide, sodium peroxide, sodium hypochlorite, calcium hydrochlorite, etc.

The product sodium chromate solution known as "yellow liquor" can easily be absorbed into the leach liquors of a chrome chemical process, since the kind of impurities and their concentration levels are similar to those normally encountered.

BRIEF DESCRIPTION OF THE DRAWING

Objects and attendant advantages of the method of the present invention will be more readily appreciated by reference to the following detailed process description, when considered in connection with the accompanying flow diagram.

Numeral 1 represents a heated, agitated, metathesis reaction vessel. When it is planned to carry out the reaction at temperatures up to and including the boiling point of the solution at atmospheric pressure, this vessel may be used in conjunction with a reflux condenser to maintain the water content of the charge sufficiently high to keep the very soluble sodium chromate which is formed, in soluton. Alternatively, this end may be achieved without the use of a reflux condenser, merely by starting with a sufficient quantity of water to insure a final solution of the desired concentration, by continuously or intermittently adding make-up water, or by operating in a closed system under autogenous pressure. The amount of water is not critical.

If it is planned to operate at temperatures above the boiling point, which offers the advantage of a faster reaction and a smaller excess of sodium carbonate, the metathesis reaction vessel should be an autoclave capable of withstanding the autogenous pressure obtained at the temperature chosen (120 p.s.i.g. at 175° C.).

If the sludge to be processed contains trivalent chromium, this could be oxidized during the digestion. Although a variety of oxidizing agents are applicable, a simple way of accomplishing the oxidation is by passing in oxygen or air. If operating at atmospheric pressure, an oxidation catalyst such as a manganese salt, preferably manganese sulfate is required. At higher temperatures (175° C.), no catalyst is required.

Numeral 2 represents storage for the barium chromate sludges, to be processed by transfer to reactor 1. Soda ash slurry tank 3 is shown positioned to feed a sodium carbonate solution or slurry to the reactor. Alternately, the dry sodium carbonate and the required water may be added to the reactor, and mixed either before or after the addition of the sludge. After the reaction period of up to about 5 hours, the reaction mixture is filtered (13), usually while hot. The barium carbonate cake containing the metallc impurities is washed on the filter with water (14), and the combined sodium chromate filtrate and wash constitutes "yellow liquor" of quality comparable to the "yellow liquor" or "leach liquor" of the chrome processing industry, with which it may be combined for the production of chrome chemicals. In the flow diagram, this liquor is transferred to yellow liquor storage 4.

The washed barium carbonate is sent to a storage 5. A portion of this cake, normally less than 10%, preferably about 3 to 6%, is sent to the agitated pH adjustment vessel 6, to which nitric acid may be admitted from nitric storage 7. Here, nitric acid is added to the barium carbonate to a pH of about 5.0 at which point most of the barium carbonate (95–96%) is converted to barium nitrate, and most of the metallic impurities (92–96%) remain insoluble as metallic carbonates or hydroxides. The barium nitrate liquor is now separated from the metallic impurities by means of filter 8, the impurities being discarded at 9 and the filtrate being transferred to blender 10.

Discarded with the metallic impurities will also be the small amount of barium carbonate which generally remains undissolved; and, if any trivalent chromium is present in the reaction mixture, a corresponding quantity of chromium hydroxide.

The balance of the wet barium carbonate in storage 5 is transferred to blender 10, wherein it is blended with the barium nitrate from filter 8 to make a barium carbonate/barium nitrate composition of value in the treatment of chromium waste liquors containing soluble chromium. Optionally, the composition may be dried to place it in a form acceptable for shipping, handling and storage. Spray drying (11) may be used successfully with $BaCO_3/Ba(NO_3)_2$ composition, and is preferred. Finally, in this flow diagram, storage of the composition is indicated as numeral 12.

DESCRIPTION OF THE PREFERRED EMBODIMENTS

Whereas the process of the present invention may be applied to barium chromate per se, it is of particular value in recovering the chromium and barium values in chromium waste treatment sludges. These sludges vary widely in composition depending on the work of the particular manufacturing unit from which they are obtained.

In a preferred embodiment of the present invention the barium chromate sludge to be treated is digested at the boiling point, at atmospheric pressure, with about 100 to 1000% of the stoichiometric amount of sodium carbonate as an aqueous solution or slurry. Preferably, the sodium carbonate should be present in an amount equal to about 300 to 900% of the stoichiometric amount, when the reaction is carried out at atmospheric pressure. The amount of water present in the mixture should desirably be such that the sodium carbonate solution has a concentration of at least about 10% by weight, and preferably is a saturated solution or slurry at the temperature of the digestion.

There is no disadvantage in having somewhat less water present than required to put all of the sodium carbonate in solution, and in fact the practice of having some solid sodium carbonate present tends to improve the yield of sodium chromate. The sodium carbonate is of course partially consumed during the digestion, producing the very soluble sodium chromate, and the highly insoluble barium carbonate.

If desired, part or all of the water required may be added by employing hydrated sodium carbonate in place of soda ash.

Although the digestion may be carried out at temperatures between 80 and 250° C., preferably between 100 and 200° C., an agitated pressure vessel such as an autoclave is required for temperatures in excess of about 105° C., the approximate boiling point of the reaction mixture. At atmospheric pressure, therefore, it is most convenient to carry out the metathetical reaction at the boiling point.

Good agitation throughout the digestion period is strongly recommended in order to obtain good yields. The digestion can be carried out for between 0.25 and 7 hours, preferably for between 1 and 5 hours.

In the event that trivalent chromium is present in the sludge, this could be oxidized to the hexavalent state, preferably during the digestion step, otherwise said trivalent chromium would be discarded along with the metallic impurities purged in a subsequent step. The trivalent chromium may be readily oxidized by most of the common oxidizing agents such as hydrogen peroxide, calcium hypochlorite, sodium hypochlorite, chlorine, oxygen, ozone, etc. A preferred method comprises merely passing a stream of air or oxygen into the digesting mixture in the presence of a small amount of an oxidation catalyst such as manganese sulfate. An amount of $MnSO_4 \cdot H_2O$ equivalent to about 0.5 to 2.0% of the weight of the sludge is usually found adequate.

If operated under pressure, good results can be obtained when the excess of sodium carbonate is as little as 3 times the stoichiometric amount, and after a digestion of as little as 1 to 2 hours.

If trivalent chromium is present, the same oxidizing agents may be used as previously suggested for the reaction at atmospheric pressure. If oxygen is added to the autoclave during the digestion step, no catalyst is required at these temperatures.

It should be noted that any $BaSO_4$ in the sludge is also converted to $Na_2SO_4$ and $BaCO_3$, and thus increases the $Na_2CO_3$ consumption relative to $BaCrO_4$.

If the metathesis is carried out at 175° C., the corresponding autogenous pressure will be about 120 p.s.i.g.

At the end of the digestion period, about 90% of the hexavalent chromium content of the sludge will be present as a solution of sodium chromate, and the barium values, as insoluble barium carbonate, in accordance with the reaction:

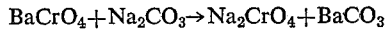

$$BaCrO_4 + Na_2CO_3 \rightarrow Na_2CrO_4 + BaCO_3$$

Following the digestion, the reaction mixture is filtered, preferably hot, to obtain a filtrate of sodium chromate solution known as "yellow liquor," and barium carbonate filter cake. This cake is given a water wash, which is combined with the yellow liquor, and an amount of the barium carbonate, generally less than 10% of the cake and preferably about 5% or less, is set aside for treatment with nitric acid.

Certain impurities in the waste sludge such as aluminum, silica and chloride ions tend to transfer into the sodium chromate yellow liquor product. None of these introduce any problem because they are normally present in chrome process liquors and their level is suitably low. Some sludges may contain fairly large amounts of sulfate as $BaSO_4$, the sulfate ion of which, transfers into the yellow liquor product as sodium sulfate; but this also introduces no problem, for this salt is ultimately separated and recovered as salt cake, a normal by-product of the manufacture of chrome chemicals.

Other metal impurities such as iron, nickel, copper and trivalent chromium in the waste sludge, transfer into the regenerated $BaCO_3$ solids and can be adequately purged by converting a part of the recovered $BaCO_3$ into $Ba(NO_3)_2$ as explained below. This $Ba(NO_3)_2$ is blended into the $BaCO_3$ as a "catalyst" to make it suitable for re-use as a waste-treatment compound.

The amount of the barium carbonate chosen for conversion to barium nitrate is dependent on the amount of metallic impurities in the sludge, and the percentage of these impurities which must be purged in order to keep an acceptable low level of impurities in the barium carbonate/barium nitrate composition.

Nitric acid is added with agitation to the 0–10% portion of the barium carbonate cake until the pH is between 3.5–6.0, or preferably 4.5 to 5.5. At this pH, about 90–97% of the barium carbonate will have dissolved, leaving about 92 to 96% of the metallic insoluble materials undissolved, generally in the form of their hydroxides or carbonates.

These insoluble impurities including the small amount of undissolved barium carbonate are purged from the system by filtration, and the filtrate is combined as "catalyst" with the balance of the barium carbonate, to thus produce a barium carbonate composition. This composition, as a result of the contained barium nitrate, is highly reactive as a compound for treating soluble chromium wastes to produce barium chromate waste sludge.

In those instances where a sludge is so impure that the resulting yellow liquor and/or barium carbonate are not considered satisfactory, the entire quantity of barium carbonate can be similarly treated with $HNO_3$ and the barium nitrate filtrate added to barium carbonate obtained from other runs to prepare the barium carbonate/barium nitrate composition. Normally, the treatment of about 5% of the total barium carbonate cake with nitric acid to produce the requisite $Ba(NO_3)_2$, and to purge a corresponding fraction of the total quantity of metallic impurities present, is sufficient. This will ordinarily insure adequate $BaCO_3$ quality when typical sludges are processed. If desired, the barium carbonate/barium nitrate composition can be dried, preferably in a spray dryer, as a convenience in shipping and handling.

EXAMPLE 1

2 net tons of wet $BaCrO_4$ sludge is placed in a steam jacketed, agitated digestion vessel equipped with a reflux condenser. The sludge is found on analysis to contain 0.43 ton $BaCrO_4$, 0.52 ton $BaCO_3$ and 1.0 ton water, the balance consisting of 4 lbs. $BaSO_4$, 6 lbs. as Al, 10 lbs. trivalent Cr, 6 lbs. Ca, 16 lbs. Sr, 10 lbs. Na, and minor quantities of Cl, Cu, Ni, Zn, Fe, Si, Mg, Co, V, Pb, Sn and Mn. To this sludge is added about 8 moles (1.44 tons) of soda ash, 2.0 tons of water, and 2 lbs. of $MnSO_4 \cdot H_2O$ as an oxidation catalyst. This mixture is then heated to the boiling point (105° C.) and digested under reflux with good agitation for 5 hours. During the digestion period air is sparged into the boiling mixture at the rate of about 2.0 cu. ft./min. Since this air entrains some water which passes the reflux condenser, make-up water is added as required during the run. The reaction mixture is then filtered hot, the filtrate of sodium chromate and sodium carbonate being held as "yellow liquor" for chrome chemical production. The barium carbonate cake is given a water wash, using 0.5 ton of water which is combined with the filtrate. The total yellow liquor comprises about 5 tons of solution containing 5.5% $Na_2CrO_4$ and 28% $Na_2CO_3$. An analysis of the yellow liquor demonstrates the presence of $Na_2SO_4$ 0.005%; NaCl 0.004%; $Al_2O_3$ 0.003%; $SiO_2$ 0.002% and NaF 0.001%. No organic matter is detected.

The wet barium carbonate cake contains 0.85 ton of $BaCO_3$, dry basis. An analysis shows the presence of 1% $Cr(OH)_3$ and less than 0.1% of Fe, Cr, Ni, Zn, Pb, etc. 5% of this barium carbonate is removed to another vessel and the pH adjusted with agitation to 5.0 by the addition of 0.039 ton of 68% $HNO_3$. This solution is filtered, and the insoluble residue of metallic hydroxides and carbonates discarded. 96% of the barium carbonate is converted to barium nitrate, and 95% of the metallic impurities present in the carbonate remain undissolved in the acid solution at pH 5.0 and are purged. The barium nitrate solution is then mixed with the major portion of the barium carbonate, as "catalyst," and the mixture spray dried to provide 0.86 ton of barium carbonate/barium nitrate composition, or waste treatment compound, of value in the treatment of wastes containing soluble hexavalent chromium salts.

In this run, sludge containing trivalent chromium was selected to demonstrate one method of oxidizing said chromium to the hexavalent state so that it would not be discarded with the purged metallic impurities. Generally, however, there is so little trivalent chromium present in the sludge that the addition of manganese sulfate, the practice of sparging air into the batch, and of adding make-up water, can be dispensed with.

EXAMPLE 2

2 net tons of a wet barium chromate sludge is placed in a steam jacketed, agitated autoclave. The sludge is found on analysis to contain 0.17 ton $BaCrO_4$, 0.67 ton $BaCO_3$, 0.11 ton $BaSO_4$ and 1.0 ton of water, the balance consisting of about 5 lbs. as Al, 8 lbs. as trivalent Cr, 6 lbs. Ca, 14 lbs. Sr, 8 lbs. Na, and minor quantities of Cl, Cu, Ni, Zn, Fe, Si, Mg, Co, V, Pb, Sn, and Mn. To this sludge is added about 4 mols (0.48 ton) of soda ash based on the $BaCrO_4$ as well as on the $BaSO_4$, which in the case of this sludge sample, is present in appreciable quantities. Since this digestion is to be carried out under pressure, three times the stoichiometric quantity would have been sufficient, but since the sludge contains 1.0 ton of water, four times the stoichiometric amount is chosen so as to provide a more concentrated sodium carbonate solution at boiling temperatures, in this instance about 32.6% based on the water present. No additional water is added. 25 lbs. of calcium hypochlorite is also added to the mixture to oxidize the trivalent chromium, to demonstrate the method. In practice, the sludge generally contains no appreciable trivalent chromium. When it does, the quantity is often too small to economically justify the use of any oxidizing agent other than air, as demonstrated in Example 1.

The mixture is agitated vigorously throughout the digestion which is carried out at 175° C. for 2 hours. The autogenous pressure developed is 120 p.s.i.g.

After reducing the temperature to somewhat under 100° C., the batch is filtered, the filtrate of sodium chromate and sodium carbonate being held as "yellow liquor" for combination with the yellow leach liquor of a chrome processing plant. The barium carbonate cake is given a hot water wash of about 0.25 ton, which wash is combined with the filtrate. The total yellow liquor comprising 1.78 tons of solution, contains 6.1% $Na_2CrO_3$, 3.7% $Na_2SO_4$ and 20.2% $Na_2CO_3$. Minor amounts of NaCl, $Al_2O_3$, $SiO_2$, and NaF are also present. No organic matter is detected.

The wet barium carbonate cake contains 0.90 ton of $BaCO_3$, dry basis. An analysis shows the presence of 1% $Cr(OH)_3$ and less than 0.5% of Fe, Cr, Ni, Zn, Pb, etc.

5% of this barium carbonate is removed to another vessel and the pH adjusted with agitation to 5.0 by the addition of .042 ton of 68% $HNO_3$. This solution is filtered, and the insoluble residue of metallic hydrates discarded. 95% of the barium carbonate is converted to barium nitrate, and 93% of the metallic impurities present in the carbonate remains insoluble in the acid solution at pH 5.0 and is purged. The barium nitrate is then mixed with the major portion of the barium carbonate as "catalyst," and the mixture is spray dried to provide 0.91 ton of barium carbonate/barium nitrate composition, as waste treatment compound, of value in the treatment of wastes containing soluble hexavalent chromium salts.

We claim:

1. A method of recovering chromium and barium values from barium chromate which comprises: reacting said barium chromate in an aqueous medium with a stoichiometric excess of sodium carbonate of between about 100 and 1000%, at a temperature within the range of 80 to 250° C., to produce a solution of sodium chromate and solid barium carbonate, and; separating the barium carbonate from said solution.

2. The method of claim 1 wherein the barium chromate is contained in a barium chromate waste sludge.

3. The method of claim 2 wherein the chromium content of the waste sludge is predominantly hexavalent chromium.

4. The method of claim 1 wherein the stoichiometric excess of sodium carbonate present in the reaction mixture lies between 300 and 900%.

5. The method of claim 1 wherein the temperature of the reaction mixture lies within the range of 100 to 200° C.

6. A method of recovering chromium and barium values from barium chromate waste sludge containing trivalent chromium, which comprises:
    (a) inducing a metathesis of barium chromate by digestion in an aqueous medium with at least a 100% stoichiometric excess of sodium carbonate at a temperature of 80 to 250° C.;
    (b) oxidizing the trivalent chromium to the hexavalent state; and
    (c) separating a solution of sodium chromate, formed by the metathetical reaction, from solid barium carbonate.

7. The method of claim 6 wherein the trivalent chromium is oxidized during the digestion step by employing an oxidizing agent selected from the group consisting of air, oxygen, and ozone.

8. The method of claim 6 wherein a manganese salt is incorporated in the reaction mixture as an oxidation catalyst.

9. A method of recovering chromium and barium values from impure barium chromate, and producing a barium carbonate/barium nitrate composition of value in the treatment of solutions containing soluble chromium salts, comprising:
    (a) digesting the barium chromate in an aqueous medium with at least 100% stoichiometric excess of sodium carbonate at a temperature of 100 to 200° C. to form a solution of sodium chromate and solid barium carbonate;
    (b) separating the solid barium carbonate;
    (c) treating a portion of the barium carbonate with nitric acid in an amount to convert at least a portion to barium nitrate;
    (d) separating the barium nitrate from the insoluble impurities; and
    (e) combining the barium nitrate and barium carbonate to produce the barium nitrate/barium carbonate composition.

10. The method of claim 9 wherein the impure barium chromate is contained in a barium chromate waste sludge.

11. The method of claim 10 wherein the chromium content of the waste sludge is predominantly hexavalent chromium.

12. The method of claim 9 wherein the stoichiometric excess of sodium carbonate present in the reaction mixture lies between 100 and 1000%.

13. The method of claim 9 wherein the stoichiometric excess of sodium carbonate present in the reaction mixture lies between 300 and 900%.

14. The method of claim 9 wherein the temperature of the reaction mixture lies within the range of 100 and 200° C.

15. The method of claim 9 wherein the nitric acid is added to at least a portion of the solid barium carbonate to bring the pH of the mixture to between 3.5 and 6.0.

16. The method of claim 9 wherein the nitric acid is added to at least a portion of the solid barium carbonate to bring the pH of the mixture to between 4.5 and 5.5.

17. The method of claim 9 wherein the quantity of barium carbonate treated with nitric acid is less than 10% of the total quantity obtained.

18. The method of claim 10 wherein the barium chromate waste sludge contains chromium in both the trivalent and hexavalent form.

19. The method of claim 18 in which the trivalent chromium is oxidized during the digestion step to the hexavalent state.

20. The method of claim 19 wherein the trivalent chromium is oxidized by employing an oxidizing agent selected from the group consisting of air, oxygen and ozone.

21. The method of claim 20 wherein a manganese salt is incorporated into the reaction mixture as an oxidation catalyst.

22. A method of removing metallic impurities from heavily contaminated barium chromate sludge, and producing a barium nitrate solution which can be combined with barium carbonate to make a barium carbonate/barium nitrate composition of value in the treatment of solutions containing soluble chromium salts, comprising:

(a) digesting the barium chromate in an aqueous medium with at least a 100% stoichiometric excess of sodium carbonate at a temperature of 100 to 200° C. to form a solution of sodium chromate and solid barium carbonate;

(b) separating the solid barium carbonate;

(c) treating substantially all of the barium carbonate with nitric acid in an amount sufficient to bring the pH within the range of 4.5 and 5.5; and (d) separating the product barium nitrate solution from the undissolved barium carbonate and metallic impurities.

23. The method of claim 22 wherein trivalent chromium present in the barium chromate sludge is oxidized during the digestion step to the hexavalent state.

References Cited

UNITED STATES PATENTS

| | | | |
|---|---|---|---|
| 3,314,747 | 4/1967 | Carlin | 423—58 |
| 3,371,034 | 2/1968 | Richards | 423—58 |

JOHN D. WELSH, Primary Examiner

U.S. Cl. X.R.

210—51, 73; 423—58, 61, 165